(12) United States Patent
Shimizu

(10) Patent No.: US 6,370,272 B1
(45) Date of Patent: Apr. 9, 2002

(54) MULTIPLE FRAME DATA HIDING METHOD AND DATA DETECTION METHOD

(75) Inventor: Shuichi Shimizu, Yokahama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/056,460

(22) Filed: Apr. 7, 1998

(30) Foreign Application Priority Data

Apr. 7, 1997  (JP) ............................................. 9-088493

(51) Int. Cl.[7] ................................................. G06K 9/36
(52) U.S. Cl. ........................................ 382/232; 348/463
(58) Field of Search ............................... 382/284, 176, 382/232, 115; 348/345, 62, 86, 125, 135, 161, 384, 571, 463, 465, 467; 725/20, 22

(56) References Cited

U.S. PATENT DOCUMENTS

| | | | | |
|---|---|---|---|---|
| 5,550,863 A | * | 8/1996 | Yurt | 375/240 |
| 5,778,143 A | * | 7/1998 | Boyce | 386/111 |
| 5,862,260 A | * | 1/1999 | Rhoads | 382/232 |
| 5,870,499 A | * | 2/1999 | Bender et al. | 382/232 |
| 5,905,819 A | * | 5/1999 | Daly | 382/284 |
| 6,055,321 A |   | 4/2000 | Numao et al. | 382/100 |
| 6,181,802 B1 |   | 1/2001 | Todd | 382/100 |

* cited by examiner

Primary Examiner—Leo Boudreau
Assistant Examiner—Ali Bayat
(74) Attorney, Agent, or Firm—Ronald L. Drumheller

(57) ABSTRACT

Data hidden in a plurality of contents is protected from illegal access by a third party. An embedding process is performed by using a frame pattern (mark) that is composed of multiple embedded block patterns comprising several different types and wherein the embedding process is varied in accordance with the time and the frame. One embedding method mixes at random several types of frame patterns having different arrangements of block patterns. The embedding method may change at random a range in which a block pattern is embedded. An embedded mark is detected by processing in parallel a plurality of patterns that are to be detected in contents, and if as a result of detection there is a reaction, it is ascertained that a mark is present. An illegal process may be traced by using an electronic fingerprint obtained by entering a false detection mark in a detector or by using an electronic fingerprint using a random sync signal for an embedding detector.

22 Claims, 8 Drawing Sheets

| | | | |
|---|---|---|---|
| + + + + + + + + | 0 0 0 0 0 0 0 0 | − − − − − − − − | 0 0 0 0 0 0 0 0 |
| + + + + + + + + | 0 0 0 0 0 0 0 0 | − − − − − − − − | 0 0 0 0 0 0 0 0 |
| 0 0 0 0 0 0 0 0 | + + + + + + + + | 0 0 0 0 0 0 0 0 | − − − − − − − − |
| 0 0 0 0 0 0 0 0 | + + + + + + + + | 0 0 0 0 0 0 0 0 | − − − − − − − − |
| − − − − − − − − | 0 0 0 0 0 0 0 0 | + + + + + + + + | 0 0 0 0 0 0 0 0 |
| − − − − − − − − | 0 0 0 0 0 0 0 0 | + + + + + + + + | 0 0 0 0 0 0 0 0 |
| 0 0 0 0 0 0 0 0 | − − − − − − − − | 0 0 0 0 0 0 0 0 | + + + + + + + + |
| 0 0 0 0 0 0 0 0 | − − − − − − − − | 0 0 0 0 0 0 0 0 | + + + + + + + + |
| Horizonal pattern (A) | | Sign inverted horizontal pattern (−A) | |

Four patterns: two horizontal patterns and two +/− sign
inverted horizonal patterns

Fig. 5

| | | | |
|---|---|---|---|
| + + + + + + + + | 0 0 0 0 0 0 0 0 | + + 0 0 − − 0 0 | 0 0 + + 0 0 − − |
| + + + + + + + + | 0 0 0 0 0 0 0 0 | + + 0 0 − − 0 0 | 0 0 + + 0 0 − − |
| 0 0 0 0 0 0 0 0 | + + + + + + + + | + + 0 0 − − 0 0 | 0 0 + + 0 0 − − |
| 0 0 0 0 0 0 0 0 | + + + + + + + + | + + 0 0 − − 0 0 | 0 0 + + 0 0 − − |
| − − − − − − − − | 0 0 0 0 0 0 0 0 | + + 0 0 − − 0 0 | 0 0 + + 0 0 − − |
| − − − − − − − − | 0 0 0 0 0 0 0 0 | + + 0 0 − − 0 0 | 0 0 + + 0 0 − − |
| 0 0 0 0 0 0 0 0 | − − − − − − − − | + + 0 0 − − 0 0 | 0 0 + + 0 0 − − |
| 0 0 0 0 0 0 0 0 | − − − − − − − − | + + 0 0 − − 0 0 | 0 0 + + 0 0 − − |

Horizontal pattern (A)　　　　　　　Vertical pattern (B)

| | | | |
|---|---|---|---|
| + + 0 0 − − 0 0 | 0 0 + + 0 0 − − | − − 0 0 + + 0 0 | 0 0 + + 0 0 − − |
| + + 0 0 − − 0 0 | 0 0 + + 0 0 − − | − − 0 0 + + 0 0 | 0 0 + + 0 0 − − |
| 0 0 − − 0 0 + + | + + 0 0 − − 0 0 | 0 0 − − 0 0 + + | − − 0 0 + + 0 0 |
| 0 0 − − 0 0 + + | + + 0 0 − − 0 0 | 0 0 − − 0 0 + + | − − 0 0 + + 0 0 |
| − − 0 0 + + 0 0 | 0 0 − − 0 0 + + | + + 0 0 − − 0 0 | 0 0 − − 0 0 + + |
| − − 0 0 + + 0 0 | 0 0 − − 0 0 + + | + + 0 0 − − 0 0 | 0 0 − − 0 0 + + |
| 0 0 + + 0 0 − − | − − 0 0 + + 0 0 | 0 0 + + 0 0 − − | + + 0 0 − − 0 0 |
| 0 0 + + 0 0 − − | − − 0 0 + + 0 0 | 0 0 + + 0 0 − − | + + 0 0 − − 0 0 |

Check pattern 1 (C)　　　　　　　Check pattern 2 (D)

16 horizonal patterns : total of eight of horizonal patterns, vertical patterns and check patterns 1 and 2, plus eight corresponding sign inverted patterns

Fig. 6

Examples of frame divided into two area

MULTIPLE FRAME DATA HIDING METHOD AND DATA DETECTION METHOD

BACKGROUND OF THE INVENTION

1. Field of the Invention

The present invention relates to a data hiding method for embedding additional information in contents, such as multiple still images, movies, multimedia or MOPES, and a data extraction method.

2. Related Art

Generally, for data hiding, additional information is hidden by performing some process for embedding it in contents. This applies not only when embedding is performed for a single part of the contents or a single frame, but also when it is performed for multiple parts of the contents or a plurality of frames.

For an example, refer to FIG. 1, an outline for a process for hiding data in a plurality of frames. FIG. 1 is a diagram showing the process for hiding information 30 (data) in contents composed of a set of sequential frames 15, which consists of single frames 10.

Commonly, for data hiding, an embedding process based on a secret key is employed to hide additional information in the contents. Specifically, as is shown in FIG. 2, frame patterns 40 are embedded in frames to hide data.

More specifically, by using an information arrangement acquired using the secret key in accordance with a specified rule, small arrays of block patterns 50 prepared in advance are arranged to produce a single pattern frame 40. This pattern frame 40 is embedded in the original contents 20 to hide the information 30.

In FIG. 2, there are four block pattern types: B1 through B4, each pattern being constructed by purposely arranging elements −1, 0 and +1. The block patterns in FIG. 2 are merely samples. In actuality, the number of block pattern types is not limited to four, and variable values, such as −k, 0 and +k (k: integer), can be used as the elements of the block pattern.

In the data hiding technique, supposing that the original contents can not be acquired, without a key, it is not easy without a key to extract embedded information from the contents and to illegally erase information.

Illegal reading of only a single image is impossible; however, when a data hiding method developed for still images is applied for moving images, or when the data hiding method is applied for multiple types of still images by using the same key, the images could be illegally read, even without a key, if a statistical process is performed for multiple image samples.

In FIG. 3 is shown an example wherein a conventional data hiding method is applied for the frame set 15. In FIG. 3, there are m types of block patterns 50, B1 to Bm, and the total number of blocks in a frame pattern 40 is N. The m type pixel block patterns are arranged in a certain order on a frame pattern 40, and the frame pattern 40 is embedded in a frame 10. This data hiding method is basically the same as the "data hiding method employing a statistical property and extraction method" disclosed in Japanese Patent Application No. Hei 8-345568.

The arrangement of block patterns in a frame pattern serves as a key for a data detection process. To deduce the arrangement of block patterns from an image frame in which data have been embedded, $m^N$ trials are required. Therefore, the deducing the arrangement without possessing a key is quite difficult when the number of calculations required is taken into consideration, since N normally denotes the number of blocks, which could be 5400, for example. However, when as is shown in FIG. 3 the block patterns are added in the same arrangement to sequential image frames, i.e., when a block pattern B is determined only at location i below:

Block Pattern: B(i), the same pattern block is employed at specified positions 25 in the frame, even though the frame numbers may differ. Relative to frames, the number of which (e.g., 1000) is so adequate that a statistically unique value can be measured by using the above property, if m types of patterns are applied to the specified locations in the frames to acquire the statistical unique value, block patterns embedded at the locations can be deduced by observing the unique value. When this measurement process is performed for the entire frame, the arrangement of the block patterns can be illegally deduced even without a key.

To extract added information from sequential data, such as video data and audio data, an extraction process must be synchronized with an embedded signal in the sequential data. For a single set of data such as stationary image, sometimes an embedded signal is repeated cyclically to defeat an illegal extraction process, so that synchronization is required for the extraction of the embedded information. However, this processing cycle is an important clue for a third party to illegally access information. This is a big problem because if embedded information can be accurately read, it is possible for the embedded information to be erased illegally.

Assuming that t denotes a frame number (time) and mod denotes a multiplication/subtraction calculation, a block pattern that is repeated at time T, for example, can be represented as follows:

Block Pattern: B(i, t mod T).

In this case, an embedded frame pattern can be deduced by measuring a statistic value every time T.

In addition, when an embedding process is to be performed using a different pattern arrangement for each frame, the block pattern is as follows:

Block Pattern: B(i, t).

While a pattern can not be illegally deduced by measuring a statistical value, there is also nothing to induce the performance of synchronized processing by a detector. As a result, another problem arises in that real-time synchronization is difficult.

The consideration or countermeasure for the above problems is not described for the conventional methods disclosed, for example, in Japanese Patent Application No. Hei 8-345568 and "Method and Apparatus for Data Hiding in Images" in U.S. patent application No. 109026-20/7116T.

SUMMARY OF THE INVENTION

It is one object of the present invention to prevent in advance a security hole that occurs when a conventional data hiding technique for stationary images is applied for video images.

That is, it is another object of the present invention to hide data in contents that are composed of a plurality of frames, to detect the hidden data, and to prevent the illegal extraction of the hidden data, or key.

It is an additional object of the present invention to hide data in a plurality of contents that are not related to each other, to detect the hidden data, and to prevent illegal extraction of the hidden data, or key.

It is a further object of the present invention to provide a method, for preventing the illegal reading of data by a third party who does not know an embedded key, whereby embedded data can not be completely read even if the third party illegally decodes a detector.

It is still another object of the present invention to provide a method for hiding an electronic fingerprint and in a detector an embedding device.

It is a still further object of the present invention to provide a data hiding method whereby a deduction is difficult for a party illegally accessing data because a large number of calculations is required, and whereby real-time synchronous detection is enabled by a detector.

To achieve the above objects, according to the present invention, provided is a method whereby an embedding process is performed by using a frame pattern (mark) that is composed of multiple embedded block patterns comprising several different types and whereby the embedding process is varied in accordance with the time and the frame. Specifically, the following methods are employed:
   an embedding method for mixing at random several types of frame patterns having different arrangements of block patterns, and
   an embedding method for changing at random a range in which a block pattern is embedded.

The following method is employed to detect an embedded mark: a method whereby a plurality of patterns to be detected in contents are processed in parallel, and whereby, if as a result of detection there is a reaction, it is ascertained that a mark is present.

The following items are employed to trace an illegal process:
   an electronic fingerprint obtained by entering a false detection mark in a detector; and
   an electronic fingerprint using a random sync signal for an embedding detector.

With the above methods, it is possible to securely protect data hidden in a plurality of contents from illegal access by a third party.

BRIEF DESCRIPTION OF THE DRAWINGS

FIG. 5 is a diagram showing a horizonal pattern and a sign inverted pattern.

FIG. 6 is a diagram showing a horizontal pattern, a vertical pattern, a check pattern 1 and a check pattern 2.

DESCRIPTION OF THE PREFERRED EMBODIMENTS

Figure 4:
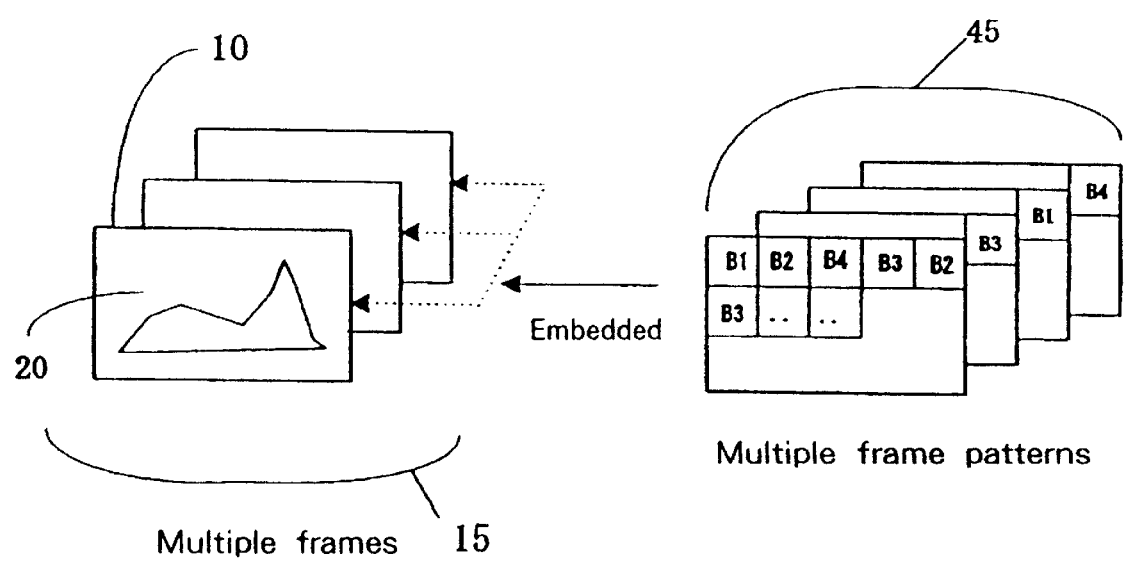
FIG. 4 is a diagram illustrating one embodiment of a data hiding method according to the present invention.

In FIG. 4 is shown a data hiding method according to one embodiment of the present invention. In FIG. 4, a plurality of contents are composed of multiple sequential frame sets 15, each of which consists of a number of frames 10. To hide data 30 in contents composed of the frame set 15 in FIG. 4, frame patterns 45 having differing block patterns are embedded in respective frames 15.

The problem that arises in the method described in Japanese Patent Application No. Hei 8-345568 is that the same pattern appears along the time axis sequentially or periodically. If to remove a cycle patterns for respective frames are so arranged that they differ, another problem which arises is that a detector can not perform synchronized processing. In this embodiment, as a method for synchronizing processing without providing a cycle, a block pattern into which a random element R(t) is introduced is employed as follows:

$$\text{Embedding pattern: } B(i) * R(t)$$

wherein R(t) denotes a function that causes +1 or −1 to appear at random relative to time t. Even when statistical values for multiple frames are measured at specified block position i by using this pattern B(i), the statistical values mutually offset by +B(i) and −B(i), so that a unique value can not be acquired. Thus, it is impossible to deduce the block pattern by performing an illegal access.

For an image for which the embedding process has been performed by using the block pattern, a detection process is performed using the detection pattern below that does not include random element R(t):

$$\text{Detecting pattern: } B(i).$$

Then, although the positive and negative signs are inverted in accordance with value R(t), when embedded, statistically, a unique value can be acquired. Thus, the detection can be successfully performed at the same calculation cost as that for a conventional process.

An explanation will now be given for a typical method whereby several types of mask patterns, which are independent and perpendicular to each other, are prepared in advance and are mixed at random for each frame.

Four types of block patterns shown in FIG. 5 are employed to form individual frame patterns 45 in FIG. 4.

The block patterns in FIG. 5 are roughly sorted into two horizontal patterns (A) and two sign inverted horizontal patterns (−A), for which the signs of the horizontal pattern are inverted.

In the following explanation given while referring to the drawings, "+" means "+k", which is "+1" or integer times it. Similarly, "−" means "−k", which is "−1" or integer times it. K is an integer other than 0, and can be changed in accordance with the condition of the contents that are an embedding target. An arbitrary value for k can be selected, regardless of the embedding method and the detection method of the present invention.

The horizontal pattern (A) is composed of two small 8×8 arrays. Small arrays (Xi, Yi), wherein elements in rows denote X elements and elements in columns denote Y elements, are as follows:

++++++++
++++++++
00000000
00000000
--------
--------
00000000
00000000 and
00000000
00000000
++++++++
++++++++
00000000
00000000
--------
--------

As is apparent from the above element arrangement, the horizontal pattern (A) is so formed that, first, like values are arranged in a row and then this row is repeated once more. Since in this pattern two rows of the same elements are arranged vertically, it can cope with an interlaced scan signal. In addition, since the same elements are sequentially arranged in a row, this pattern can effectively cope with a horizontal low-frequency filter, such as an NTSC. Further, since a space frequency is set low both vertically and horizontally, this pattern can cope with a compression system, such as MPEG.

In addition to the two small arrays above, two other block patterns, i.e., sign inverted horizontal patterns (–A) having inverted signs for the elements in the horizontal pattern (A), are employed:

--------
--------
00000000
00000000
++++++++
++++++++
00000000
00000000
and
00000000
00000000
--------
--------
00000000
00000000
++++++++
++++++++

Note that scalar products of the arrays are 0, i.e., perpendicular.

Another block pattern having 16 arrays is shown below. This pattern is roughly sorted into two horizontal patterns (A), two vertical patterns (B), two check patterns 1(C), two check patterns 2(D), and eight sign inverted arrays for respective patterns. The elements of these patterns are shown below. It should be noted that the horizontal patterns (A) are not shown because they are the same as shown above, and small, sign inverted arrays are also not shown because only the sign "+" in the small arrays is changed to the sign "–" and the sign "–" is changed to the sign "+" in the same manner as for the horizonal patterns (A).

The vertical pattern (B) is formed of the following two arrays:
++00--00
++00--00
++00--00
++00--00
++00--00
++00--00
++00--00
++00--00
and
00++00--
00++00--
00++00--
00++00--
00++00--
00++00--
00++00--
00++00--

The check pattern 1(C) is formed of the following two arrays:
++00--00
++00--00
00--00++
00--00++
00--00++
--00++00
--00++00
00++00--
00++00--
and
00++00--
00++00--
++00--00
++00--00
00--00++
00--00++
--00++00
--00++00

The check pattern 2(D) is formed of the following two arrays:
--00++00
--00++00
00--00++
00--00++
++00--00
++00--00
00++00--
00++00--
and
00++00--
00++00--
--00++00
--00++00
00--00++
00--00++
++00--00
++00--00

The mask patterns that are independent of and perpendicular to each other are arranged according to the specified rules, and the block patterns that differ from each other are so arranged that they form a frame pattern. Among several types of thus formed frame patterns, one frame pattern is selected at random and embedded in each frame.

The lists of the above block patterns are shown in FIGS. 5 and 6.

In another embodiment, the several types of block patterns above are employed to prepare a number of types of frame patterns that differ from each other. Then, each frame is divided at random into a number of small block areas equivalent in number to the types of frame patterns, so that the frames differ from each other. One of the frame patterns is exclusively selected at random and embedded in the small areas in the frame.

In an additional embodiment, the several block patterns above are employed to form a number of different frame patterns, which are then sorted into a plurality of groups, the number of which is equal to or smaller than the number of frame pattern types. A plurality of frames are divided at random into small block areas and in a number that is equivalent to the number of groups, so that the frames differ from each other. One of the groups is exclusively selected for each small area in the frame, and one frame pattern is selected at random from the selected group and embedded in the frame.

The lists of the block patterns are shown in FIGS. 5 and 6.

In a further embodiment, it is possible to employ a method for selecting one frame pattern and one sign inverted frame pattern at random for each frame and embedding them, and to employ a method whereby several types of frame patterns are so arranged that block patterns at the same position are mutually exclusive, and are mixed at random for each frame.

Employed as a detection method is a method for performing in parallel a detection process for respective patterns. A unique value that is acquired during the detection process may be regarded as the detection result. At this time, since a calculation cost is increased only several times, this will not constitute a problem.

Figure 7:
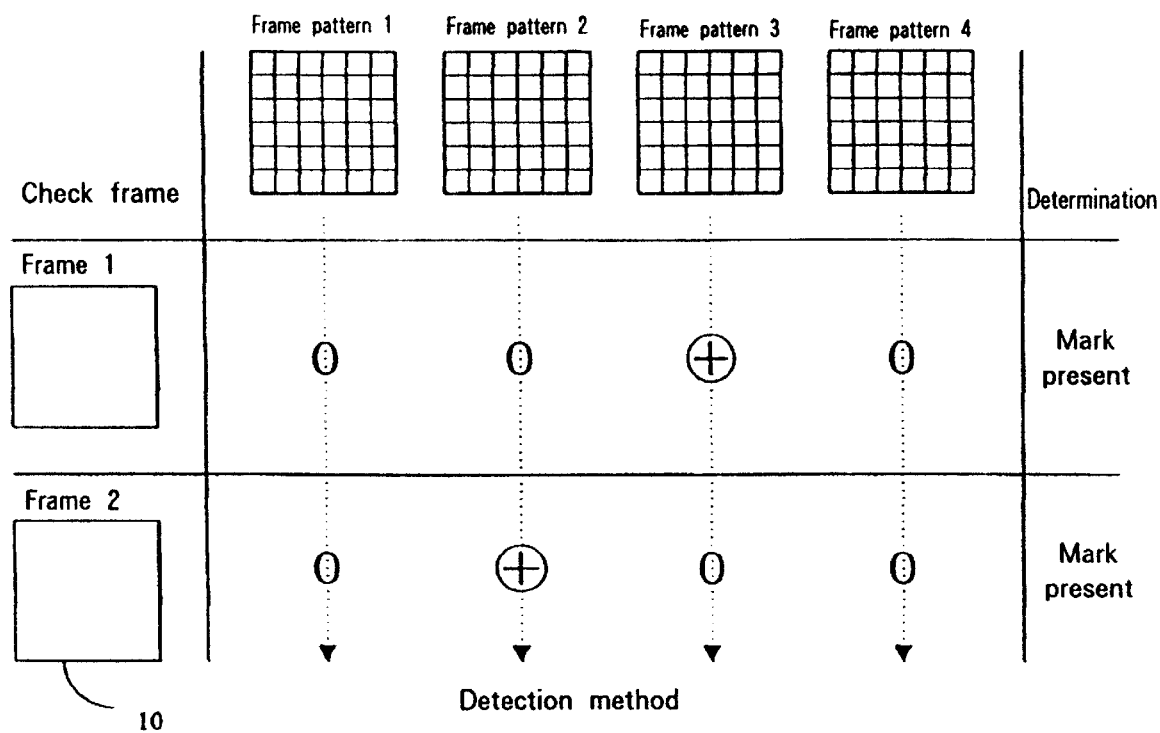
FIG. 7 is a diagram illustrating one embodiment for data detection according to the present invention.

One embodiment for a detection method is shown in FIG. 7. In FIG. 7, scalar products of a frame 1 to be checked and all types of frame patterns (four in FIG. 7, but this may differ depending on the number of frame patterns employed) are acquired. When there is a reaction at one of the scalar products, it is ascertained that a mark is present. Similarly, a detection process for a frame 2 relative to all the frame patterns is also performed in parallel. Since there is a reaction at a scalar value of the frame 2 and frame pattern 2, it is ascertained that a mark is present.

As a further embodiment for a data hiding method relative to a plurality of frames, a method is employed by which a range, within which a frame pattern is embedded, is randomly changed for each frame by using block units. If several substantially perpendicular marks are to be superimposed and embedded to represent multiple bits, a method by which an embedding location for each bit is changed at random for each frame is an effective countermeasure for defeating illegal deduction attempt.

To embed 2-bit information, employed in Japanese Patent Publication No. Hei 8-345568 is a method for superimposing two frame patterns that are substantially perpendicular and adding them together. In this embodiment, an embedding range is divided so as not to overwrite data, and the frame patterns are added to halves of blocks that are mutually exclusive.

Figure 8:
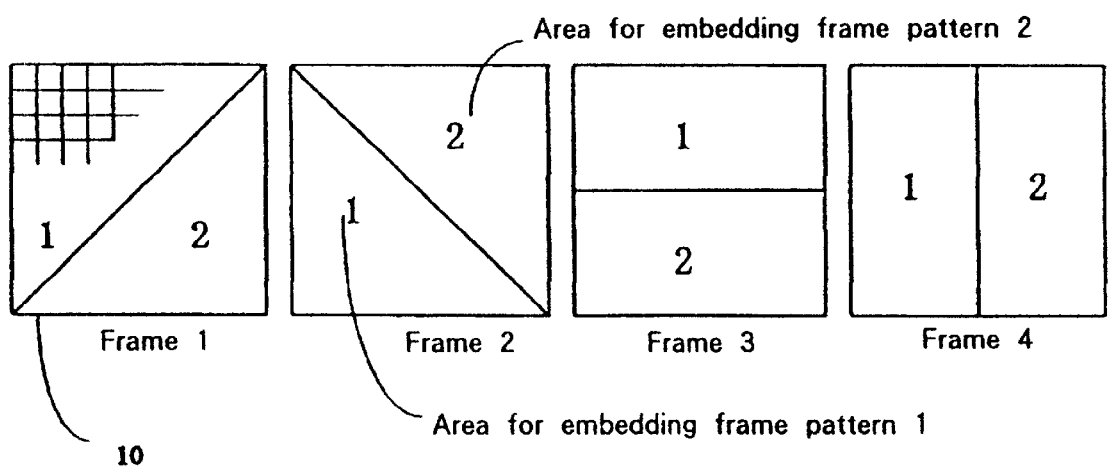
FIG. 8 is a diagram showing a frame division example for embedding two-bit information.

In FIG. 8, each of frames 1 through 4 are divided into two areas, and both areas of each frame are the same size. That is, supposing the size of a frame is 1, then the area divisions could each be ½ the frame. The division of a frame is randomly performed by block units, so that the block divisions for each frame differ and also so that the frame does not have to be divided into sequential areas. Thus, the frame divisions are not limited to those shown in FIG. 8.

As for the division of the frame 1, for example, two frame patterns that are substantially perpendicular are superimposed on areas 1 and 2 of the frame 1 and are added together. The same process is performed for the frames 2, 3 and 4. Which frame pattern is to be superimposed on which area, 1 or 2, is arbitrarily determined.

Since the division of frames is performed at random, a person who illegally attempts to detect marks can not specify a correct range for each frame. It is possible, however, for a person who knows two frame patterns that are substantially perpendicular to calculate a scalar product for an entire frame and the two frame patterns, and to thus detect a reaction. This is because the two patterns are arranged perpendicularly and thus no other pattern can affect the detection process. As for the determination of reactions, since statistically unique values are merely reduced by half, marks can be correctly detected.

Figure 1:
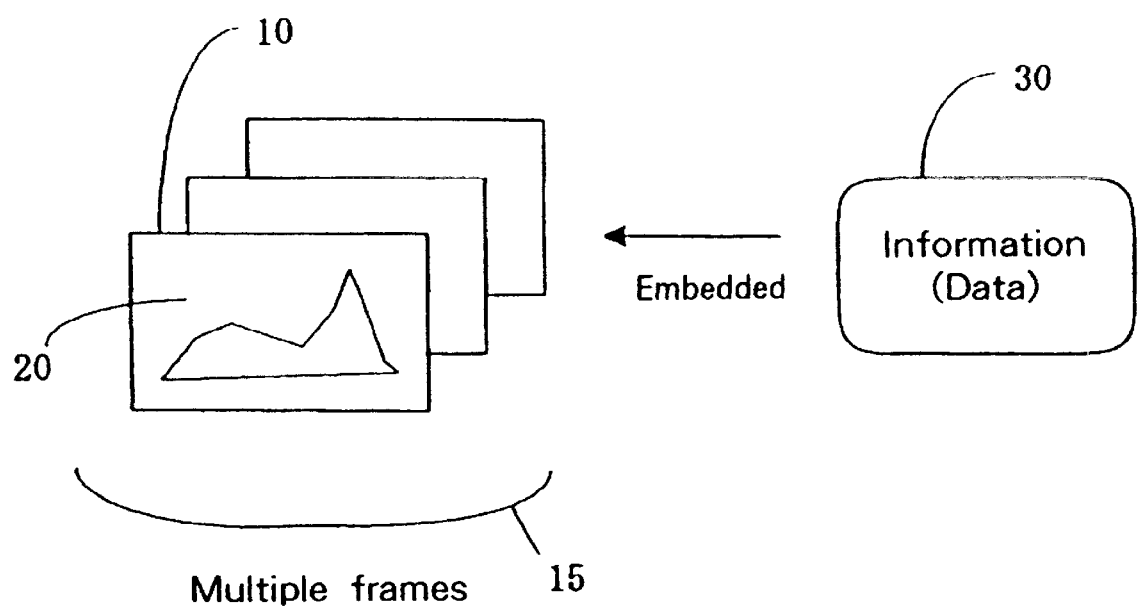
FIG. 1 is a diagram illustrating the outline of data hiding for a plurality of frames.
Figure 2:
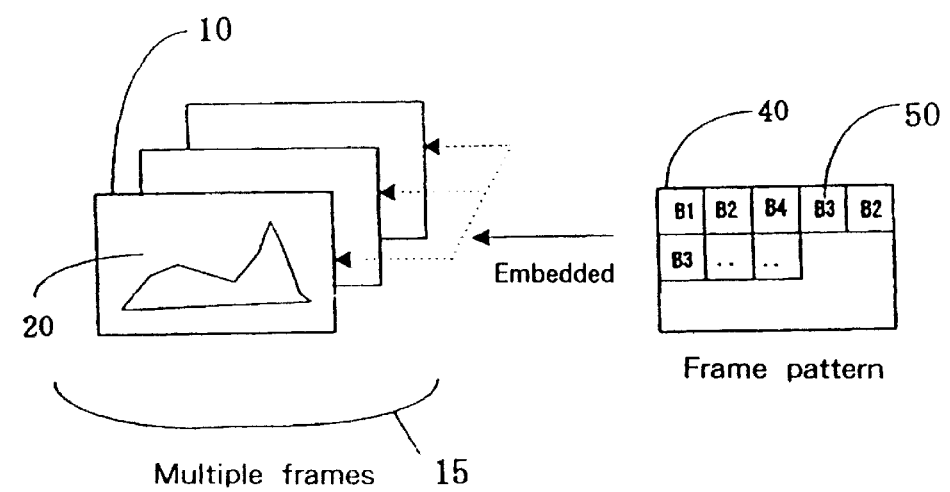
FIG. 2 is a diagram showing the application of a conventional method used for data hiding for a plurality of frames.
Figure 3:
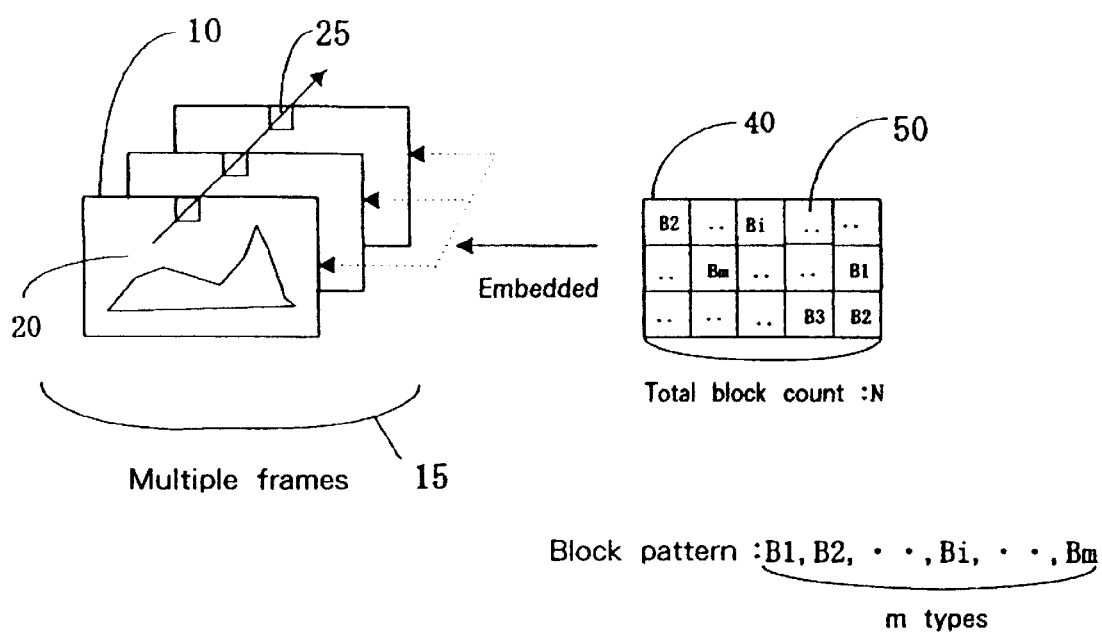
FIG. 3 is a diagram showing a problem that arises when the conventional method is used for a plurality of frames.

If an illegal authenticated user tries to acquire a statistically unique value at an arbitrary block position (e.g., the position 25 in FIG. 3), a pattern at the first bit and a pattern at the second bit appear at the block position at almost the same probability, so that the statistically unique value can not be measured. Even if the illegal authenticated user measures the correlation at two arbitrary block positions to deduce the arrangements for the block patterns, since the probability that all of combinations of the first-bit pattern and the second-bit pattern will appear is almost the same, a unique correlated value also will not be acquired. As a result, an illegal reading will fail.

The above method for selecting an embedding range at random is also effective as a method whereby deducing a specific embedding operation by using a detection algorithm is prevented. This is because, since the embedding range is set so that it is smaller than the detection range, asymmetry of the embedding operation and the detection operation is implemented. Assuming that the frame pattern is illegally acquired, in order to erase an embedded signal using the pattern arrangement, a ½ size area where embedding was actually performed must be specified. However, since $_NC_{N/2}$ trials are required for each frame, to do this is impossible because of the enormous number of calculations required. If the illegally decoded pattern arrangement is employed unchanged to perform a reverse operation, an opposite (inverted sign) mark is newly embedded in one ½ size area, even though a signal in the remaining ½ size area, for which the embedding operation was performed, can be erased. As a result, the embedded signal can not be erased completely.

In an additional embodiment for a data hiding method relative to a plurality of frames, several frame patterns, for each of which block patterns that are not arranged in a tile-like configuration are mixed at random and embedded in a plurality of frames.

Block patterns are not arranged in a matrix and block boundaries fluctuate by shifting from the division of tiles to form several types of frame patterns. The frame patterns are employed for an embedding process and a detection process. As a result, there is a considerable increase in the number of trials for the positioning and the combining of blocks that an illegal authenticated user is required to perform.

In an embodiment for tracing the source of a leak when an algorithm is illegally read from a detector, in addition to employing a plurality of types of frame patterns in the data hiding method used for the frames, false frame patterns are incorporated as electronic fingerprints in the detector.

The arrangement of false frame patterns is an arrangement of patterns that is not actually employed in the embedding process. Since the false patterns are so incorporated that they differ for each detector or for each provider of a detector, the source of a leak can be determined by using an inherent pattern.

In another embodiment for tracing the source of a leak, the randomness used in the embedding process is employed as an electronic fingerprint for an embedding device.

Generally, a series of pseudo-random numbers to be generated is unconditionally determined by employing a random number calculation expression and an initial value. Therefore, especially when the parameter (coefficient) of the random number calculation expression differs for each embedding detector and a row of random numbers to be generated, i.e., a pattern arrangement row is changed, an arrangement row inherent to the embedding device is generated and is employed as electronic fingerprints for tracing the source of a leak.

In the above embodiments, an information embedding method and a detection method, mainly concerned with whether there are hidden data, have been described. However, when a frame is divided into small segments and embedding and detection processing is performed for these segments, multiple-bit information can be embedded and detected by using the same method.

Further, a data hiding method for a plurality of frames has been described, and a data hiding method for a plurality of contents, such as a set of multiple stationary images, can be employed in the same manner because for the present invention there are no limitations imposed on the relationship existing between frames. In other words, a plurality of frames may be replaced with a plurality of stationary images or a plurality of contents.

By employing the data hiding method and the detection method of the present invention, it is possible to prevent in advance a security hole that occurs when a conventional data hiding method for stationary images is employed for video images. The data hiding method of the present invention can be used not only for hiding ownership information, such as watermarking, and copyright information, but also for labeling whereby a signal for copy control or play control is embedded directly in a video image by using the data hiding method, and is then detected by a reception unit, such as a recorder or a player, and is examined to determine whether or not it includes copy enabling/play enabling instructions, so that an apparatus can be controlled in accordance with the result of the determination.

For a "labeling" application in the DVD (Digital Video Disk) field, the satellite distribution and VOD (Video On Demand) fields and the cable television field, resistance relative to the defeat of an illegal attack is also required. The method of the present invention ensures the availability of such resistance.

What is claimed is:

1. A data hiding method for embedding information into contents which include a plurality of frames, in which the embedded information cannot be extracted using only statistical methods, comprising the steps of:
    (a) defining a plurality of different block patterns, each of said block patterns being represented as a small array of elements each having a value;
    (b) constructing a plurality of different frame patterns, each of said frame patterns consisting of a plurality of said block patterns arranged into an array in accordance with a specified rule; and
    (c) embedding said frame patterns into said plurality of frames, with each of said different frame patterns being embedded in a different one of said frames, wherein different block patterns are embedded into successive ones of said frames at corresponding locations without forming a cyclic pattern and wherein corresponding elements of said different block patterns have an average value of zero to make extraction of block patterns without having the specified rule using only statistical methods impractical or impossible.

2. The data hiding method according to claim 1, wherein said block patterns are substantially perpendicular to each other.

3. The data hiding method according to claim 1, wherein each of said block patterns is composed of four types of 8×8 array patterns, two of which are horizontal patterns, and two of which are sign inverted horizontal patterns for which the signs of said horizontal pattern are inverted.

4. The data hiding method according to claim 1, wherein each of said block patterns is composed of 16 types of 8×8 array patterns, two of which are horizontal patterns, two of which are vertical patterns, two of which are a first check pattern, two of which are a second check pattern, and eight of which are sign inverted patterns for which the signs of the eight patterns are inverted.

5. A data hiding method for embedding information into contents which include a plurality of frames, in which the embedded information cannot be extracted using only statistical methods, comprising the steps of:
    (a) defining a plurality of different block patterns, each of said block patterns being represented as a small array of elements each having a value;
    (b) constructing a plurality of different frame patterns, each of said frame patterns consisting of a plurality of said block patterns arranged in an array in accordance with a specified rule, said block patterns being so arranged in each said array so as to differ from adjacent block patterns; and
    (c) for each said frame, selecting one of said frame patterns at random from among said plurality of different frame patterns and embedding said selected frame pattern into said each frame, wherein different block patterns are embedded into successive ones of said frames at corresponding locations without forming a cyclic pattern and wherein corresponding elements of said different block patterns have an average value of zero to make extraction of block patterns without having the specified rule using only statistical methods impractical or impossible.

6. A data hiding method for embedding information into contents which include a plurality of frames, in which the embedded information cannot be extracted using only statistical methods, comprising the steps of:
    (a) defining a plurality of different block patterns, each said block pattern being represented as a small array of elements each having a value;
    (b) constructing a plurality of different frame patterns, each of said frame patterns consisting of a plurality of said block patterns arranged in an array in accordance with a specified rule, the number of said block patterns in each said array being equal to the number of said different frame patterns, said block patterns being so arranged in each said array so as to differ from adjacent block patterns; and
    (c) for each said frame, selecting one of said frame patterns at random from among said plurality of different frame patterns and embedding said selected frame pattern into said each frame, wherein different block patterns are embedded into successive ones of said frames at corresponding locations without forming a cyclic pattern and wherein corresponding elements of said different block patterns have an average value of zero to make extraction of block patterns without having the specified rule using only statistical methods impractical or impossible.

7. A data hiding method for embedding information into contents which include a plurality of frames, in which the embedded information cannot be extracted using only statistical methods, comprising the steps of:

(a) defining a plurality of different block patterns, each said block pattern being represented as a small array of elements each having a value;

(b) constructing a plurality of different frame patterns, each of said frame patterns consisting of a plurality of said block patterns arranged in an array in accordance with a specified rule, said block patterns being so arranged in each said array so as to differ from adjacent block patterns, and said different frame patterns being sorted into frame pattern groups, the number of said groups being equal to or smaller than the number of said different frame patterns and the number of said block patterns in each said array being equal to the number of said groups; and (c) for each said frame, selecting one of said frame pattern groups at random, selecting one of said frame patterns from said selected group, and embedding said selected frame pattern into said each frame, wherein different block patterns are embedded into successive ones of said frames at corresponding locations without forming a cyclic pattern and wherein corresponding elements of said different block patterns have an average value of zero to make extraction of block patterns without having the specified rule using only statistical methods impractical or impossible.

8. A data detecting method for detecting information embedded into contents which include a plurality of frames, in which the embedded information cannot be extracted using only statistical methods, said method comprising the steps of:

(a) preparing a plurality of block patterns, each of said block patterns using said embedded information and being represented as a small array of elements each having a value;

(b) constructing frame patterns, said frame patterns consisting of said block patterns located in accordance with specified rules, wherein different block patterns are embedded into successive ones of said frames at corresponding locations without forming a cyclic pattern and wherein corresponding elements of said different block patterns have an average value of zero to make extraction of block patterns without having the specified rule using only statistical methods impractical or impossible; and (c) detecting said embedded information from said plurality of frames by calculating scalar products between each said frame and all of said frame patterns.

9. The method according to claim 8, wherein said information is detected by using at least one of the scalar products of said frame patterns.

10. The method according to claim 8, wherein at said step of constructing said frame patterns, a false pattern arrangement is added to the arrangement provided in accordance with said specified rules.

11. The method according to claim 8, wherein at said step of constructing said frame patterns, said arrangement provided in accordance with said specified rules is obtained in accordance with a random number row that differs for each detector.

12. A data hiding method for embedding information into a plurality of contents, in which the embedded information cannot be extracted using only statistical methods, comprising the steps of:

(a) defining a plurality of different block patterns, each of said block patterns being represented as a small array of elements each having a value;

(b) constructing a plurality of different frame patterns, each of said frame patterns consisting of a plurality of said block patterns arranged into an array in accordance with a specified rule; and (c) embedding said frame patterns into said plurality of contents, with each of said different frame patterns being embedded in a different content, wherein different block patterns are embedded into said contents at corresponding locations without forming a cyclic pattern and wherein corresponding elements of said different block patterns have an average value of zero to make extraction of block patterns without having the specified rule using only statistical methods impractical or impossible.

13. The data hiding method according to claim 12, wherein said block patterns are substantially perpendicular to each other.

14. The data hiding method according to claim 12, wherein each of said block patterns is composed of four types of 8×8 array patterns, two of which are horizontal patterns, and two of which are sign inverted horizontal patterns, for which the signs of said horizontal pattern are inverted.

15. The data hiding method according to claim 12, wherein each of said block patterns is composed of 16 types of 8×8 array patterns, two of which are horizontal patterns, two of which are vertical patterns, two of which are check patterns of a first type, two of which are check patterns of a second type, and eight of which are sign inverted patterns, for which the signs of the eight patterns are inverted.

16. A data hiding method for embedding information into a plurality of contents, in which the embedded information cannot be extracted using only statistical methods, comprising the steps of:

(a) defining a plurality of different block patterns, each of said block patterns being represented as a small array of elements each having a value;

(b) constructing a plurality of different frame patterns, each of said frame patterns consisting of a plurality of said block patterns arranged in an array in accordance with a specified rule, said block patterns being so arranged in each said array so as to differ from adjacent block patterns; and (c) for each said content, selecting one of said frame patterns at random from among said plurality of different frame patterns and embedding said selected frame pattern into said each content, wherein different block patterns are embedded into successive contents at corresponding locations without forming a cyclic pattern and wherein corresponding elements of said different block patterns have an average value of zero to make extraction of block patterns without having the specified rule using only statistical methods impractical or impossible.

17. A data hiding method for embedding information into a plurality of contents, in which the embedded information cannot be extracted using only statistical methods, comprising the steps of:

(a) defining a plurality of different block patterns, each of said block patterns being represented as a small array of elements each having a value;

(b) constructing a plurality of different frame patterns, each of said frame patterns consisting of a plurality of said block patterns arranged in an array in accordance with a specified rule, the number of said block patterns in each said array being equal to the number of said different frame patterns, said block patterns being so arranged in each said array so as to differ from adjacent block patterns; and (c) for each said content, selecting one of said frame patterns at random from among said plurality of different frame patterns and embedding said selected frame pattern into said each content, wherein different block patterns are embedded into successive contents at corresponding locations without forming a cyclic pattern and wherein corresponding elements of said different block patterns have an average value of zero to make extraction of block patterns without having the specified rule using only statistical methods impractical or impossible.

18. A data hiding method for embedding information into a plurality of contents, in which the embedded information cannot be extracted using only statistical methods, comprising the steps of:

(a) defining a plurality of different block patterns, each of said block patterns being represented as a small array of elements each having a value;

(b) constructing a plurality of different frame patterns, each of said frame patterns consisting of a plurality of said block patterns arranged in an array in accordance with a specified rule, said block patterns being so arranged in each said array so as to differ from adjacent block patterns, and said different frame patterns being sorted into frame pattern groups, the number of said groups being equal to or smaller than the number of said different frame patterns and the number of said block patterns in each said array being equal to the number of said groups; and (c) for each said content, selecting one of said frame pattern groups at random, selecting one of said frame patterns from said selected group, and embedding said selected frame pattern into said each content, wherein different block patterns are embedded into successive contents at corresponding locations without forming a cyclic pattern and wherein corresponding elements of said different block patterns have an average value of zero to make extraction of block patterns without having the specified rule using only statistical methods impractical or impossible.

19. A data detecting method for detecting information embedded into a plurality of contents, in which the embedded information cannot be extracted using only statistical methods, comprising the steps of:

(a) preparing a plurality of block patterns, each of said block patterns using said embedded information and being represented as a small array of elements each having a value;

(b) constructing frame patterns, said frame patterns consisting of said block patterns located in accordance with specified rules, wherein different block patterns are embedded into successive ones of said frames at corresponding locations without forming a cyclic pattern and wherein corresponding elements of said different block patterns have an average value of zero to make extraction of block patterns without having the specified rule using only statistical methods impractical or impossible; and (c) detecting said embedded information from said plurality of contents by calculating scalar products between each said content and all of said frame patterns.

20. The method according to claim 19, wherein said information is detected by using at least one of the scalar products of said frame patterns.

21. The method according to claim 19, wherein at said step of constructing said frame patterns, a false pattern arrangement is added to the arrangement provided in accordance with said specified rules.

22. The method according to claim 19, wherein at said step of constructing said frame patterns, said arrangement provided in accordance with said specified rules is obtained in accordance with a random number row that differs for each detector.

* * * * *